United States Patent
Totsuka

(10) Patent No.: US 7,633,540 B2
(45) Date of Patent: Dec. 15, 2009

(54) IMAGE PICKUP APPARATUS AND IMAGE READING APPARATUS USING IMAGE PICKUP APPARATUS

(75) Inventor: Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 11/737,409

(22) Filed: Apr. 19, 2007

(65) Prior Publication Data

US 2007/0279503 A1    Dec. 6, 2007

(30) Foreign Application Priority Data

May 1, 2006    (JP)    ............................. 2006-127551

(51) Int. Cl.
*H04N 5/335*    (2006.01)

(52) U.S. Cl. ...................................... 348/294

(58) Field of Classification Search .................. 348/294
See application file for complete search history.

(56) References Cited

U.S. PATENT DOCUMENTS

| | | | |
|---|---|---|---|
| 5,070,414 A * | 12/1991 | Tsutsumi | 358/466 |
| 5,909,247 A | 6/1999 | Hosokai et al. | |
| 6,130,712 A | 10/2000 | Miyazaki et al. | 348/243 |
| 2002/0158976 A1 * | 10/2002 | Vni et al. | 348/243 |
| 2004/0189843 A1 * | 9/2004 | Holberg et al. | 348/294 |
| 2005/0068436 A1 * | 3/2005 | Fraenkel et al. | 348/294 |
| 2005/0094005 A1 * | 5/2005 | Xu | 348/243 |
| 2006/0114343 A1 * | 6/2006 | Zhang et al. | 348/294 |
| 2006/0250513 A1 * | 11/2006 | Yamamoto et al. | 348/294 |
| 2007/0222870 A1 * | 9/2007 | Itoh | 348/243 |

FOREIGN PATENT DOCUMENTS

| | | |
|---|---|---|
| JP | 02-051981 A | 2/1990 |
| JP | H04-39785 | 2/1992 |
| JP | 04-142890 A | 5/1992 |
| JP | H07-288660 | 10/1995 |
| JP | 9-331420 A | 12/1997 |

* cited by examiner

*Primary Examiner*—James M Hannett
(74) *Attorney, Agent, or Firm*—Fitzpatrick, Cella, Harper & Scinto

(57) ABSTRACT

A pixel output time required for shielded pixels is realized by the smallest possible number of pixels. An apparatus includes: a plurality of pixels arranged in a first unshielded pixel region and a shielded second pixel region and having a photoelectric conversion unit for converting an optical signal into an electric signal; and a scanning unit for selectively scanning the plurality of pixels according to a pixel selection signal in synchronization with a clock signal. The scanning unit includes: a first scanning circuit for selectively scanning the plurality of pixels arranged in the first pixel region according to the pixel selection signal synchronous to the first clock signal; a second scanning circuit for selectively scanning the plurality of pixels arranged in the second pixel region according to the pixel selection signal synchronous to the second clock signal; and a clock speed reducing unit for outputting a clock signal obtained by reducing the speed of a frequency of the first clock signal as the second clock signal to the second scanning circuit.

6 Claims, 5 Drawing Sheets

IMAGE PICKUP APPARATUS AND IMAGE READING APPARATUS USING IMAGE PICKUP APPARATUS

BACKGROUND OF THE INVENTION

1. Field of the Invention

The present invention relates to an image pickup apparatus for use in an image reading apparatus such as a copying machine, a scanner, etc.

2. Description of the Related Art

Conventionally, a solid-state image pickup apparatus for use in a copying machine etc. includes a plurality of pixels, a scanning circuit, a transfer unit, and an output circuit. The plurality of pixels convert by a photoelectric conversion unit optical signals to electric signals. The scanning circuit sequentially and selectively scans the plurality of pixels in a time series. The transfer unit sequentially transfers the electric signal for each pixel according to a timing signal from the scanning circuit. The output circuit outputs the electric signal transferred from the transfer unit to an output terminal.

Specifically, for example, in a CMOS type sensor, a pixel is configured by a photoelectric conversion unit for converting an optical signal into a charge signal, a charge to voltage conversion unit, and a signal storage unit. A transfer unit is a common output line, and is connected to an output amplifier as an output circuit. With the configuration, a voltage signal stored in the signal storage unit for each pixel is sequentially transferred to the output amplifier through the common output line according to a timing signal from the scanning circuit.

The above-mentioned solid-state image pickup apparatus is described in Japanese Patent Application Laid-Open No. H9-331420. The solid-state image pickup apparatus disclosed by the above-mentioned publication has an effective pixel region in which image information is photoelectrically converted and a region of an optical black pixel (hereinafter referred to as an "OB pixel" in which a photoelectric conversion unit is shielded to output a black reference level. The configuration and the operations of the conventional solid-state image pickup apparatus are described below by referring to the attached drawings.

FIG. 8 shows the configuration of the conventional solid-state image pickup apparatus. The apparatus includes an effective pixel region 1, an OB pixel region 2, a scanning circuit 3, a clock signal 4 for driving the scanning circuit, and a pixel selection signal 5 output from the scanning circuit in synchronization with the clock signal. A pixel selection circuit 6 connects each pixel of the effective pixel region 1 or the OB pixel region 2 to a transfer unit according to the pixel selection signal. The apparatus also includes a transfer unit 7 and an output circuit 8. FIG. 8 shows, for example, an eight-pixel line sensor configured by four OB pixels and four effective pixels.

The operation is described below by referring to the timing chart shown in FIG. 9. The pixel selection signal 5 in synchronization with the first clock signal 4 is output from the scanning circuit 3, and each pixel in the OB pixel region 2 and the effective pixel region 1 is sequentially selected pixel by pixel in a time series as shown in FIG. 9. Thus, the selected pixel and the transfer unit 7 are connected by the pixel selection circuit 6, an electric signal stored in the pixel is transferred to the output circuit 8, and externally output from the circuit. In the example shown in FIG. 9, the output level is held over a cycle of the first clock signal 4, but a signal output level and a reset level can be combined and output in one cycle in a certain solid-state image pickup apparatus.

The output electric signal of the OB pixel region 2 is fetched by a clamping unit and an averaging unit in a signal processing unit at the subsequent stage, and is used as a black reference level. An electric signal of the effective pixel region 1 is input to the signal processing unit at the subsequent stage, and processed as image information.

As described above, the OB pixel output requires a certain stability time because of the operation through the clamping unit etc. for fetching as a black reference level at the subsequent stage. As described above by referring to FIG. 9, when the conventional solid-state image pickup apparatus is used, the effective pixels and the OB pixels are scanned at the same frequency. Therefore, it is necessary to provide the number of OB pixels corresponding to the required stability time, and secure the OB pixel output time, thereby increasing the entire area of chips.

In a certain copying machine etc., a different clock frequency can be used. Therefore, although the same OB pixel output time is required, a larger number of OB pixels are required in a system of a high-speed operation, and a smaller number of OB pixels are required in a system operating at a lower speed. Additionally, depending on the signal processing unit connected at the subsequent stage, a different OB pixel output time can be required. Thus, since a different OB pixel output time can be required depending on the system, a solid-state image pickup apparatus having an OB pixel output time for each system, that is, each number of OB pixels, has to be developed.

SUMMARY OF THE INVENTION

The present invention has been developed to solve the above-mentioned problems, and aims at realizing a pixel output time required for a shielded pixel region using a smaller number of pixels, and realizing a reduced chip area.

To attain the above-mentioned objective, an image pickup apparatus according to the present invention includes: a plurality of pixels arranged in a first unshielded pixel region and a shielded second pixel region and each having a photoelectric conversion unit for converting an optical signal into an electric signal; and a scanning unit for selectively scanning the plurality of pixels according to a pixel selection signal in synchronization with a clock signal, and transfers and outputs the electric signal from the plurality of pixels scanned by the scanning unit, and is characterized in that the scanning unit includes: a first scanning unit for selectively scanning the plurality of pixels arranged in the first pixel region according to the pixel selection signal; a second scanning unit for selectively scanning the plurality of pixels arranged in the second pixel region according to the pixel selection signal; and a clock input unit capable of independently inputting a clock signal having a different frequency to each of the first and second scanning units.

The solid-state image pickup apparatus according to the present invention is further characterized in that the clock signal input to the second scanning unit is lower in frequency than the clock signal input to the first scanning unit.

In the present invention, the clock input unit can further include a clock speed reducing unit for generating a clock signal obtained by reducing the speed of a frequency of the first clock signal, and outputting the generated clock signal as the second clock signal to the second scanning unit. The clock speed reducing unit can also be a frequency divider for dividing a frequency of the first clock signal, and outputting the frequency-divided clock signal as the second clock signal.

In the present invention, the clock input unit can include: a variable unit for clock frequency for generating a clock signal in which a frequency of the first clock signal is changed according to a clock frequency control signal, and outputting the generated clock signal as the second clock signal to the second scanning unit; and a control input unit for inputting the clock frequency control signal to the variable unit for clock frequency. The variable unit for clock frequency can include a frequency divider for dividing a frequency of the first clock signal and outputting a plurality of frequency-divided clock signals having different frequencies, and a first clock selection unit for selectively outputting any of the plurality of clock signals output by the frequency divider as the second clock signal according to the clock frequency control signal.

In the present invention, the clock input unit can include: a variable unit for clock frequency for generating a clock signal in which a frequency of the first clock signal is changed according to a first clock frequency control signal, and outputting the generated clock signal as the second clock signal to the second scanning unit, and generating a clock signal in which a frequency of the first clock signal is changed according to a second clock frequency control signal and outputting the generated clock signal as a third clock signal to the first scanning unit; and a control input unit for inputting the first and second clock frequency control signals to the variable unit for clock frequency. The first scanning unit can selectively scan the plurality of pixels arranged in the first pixel region according to a pixel selection signal in synchronization with the third clock signal.

The variable unit for clock frequency can include: a frequency divider for dividing a frequency of the first clock signal and outputting a plurality of frequency-divided clock signals having different frequencies; a first clock selection unit for selectively outputting any of the plurality of clock signals output by the frequency divider as the second clock signal according to the first clock frequency control signal; and a second clock selection unit for selectively outputting any of the plurality of clock signals output by the frequency divider as the third clock signal according to the second clock frequency control signal.

An image reading apparatus according to the present invention is characterized by including any of the above-mentioned image pickup apparatuses.

According to the present invention, clock signals having different frequencies are independently input to the first and second scanning units to drive each scanning unit. Therefore, it is not necessary to consider the timing for switching clock signals in the first and second pixel regions. As a result, an output frequency of a shielded pixel region can be controlled in a simple circuit configuration. Furthermore, the present invention also drives the scanning unit for scanning the shielded pixel region according to the second clock signal having a frequency lower than the first clock signal. Thus, as compared with the conventional solid-state image pickup apparatus, an output time of a pixel region shielded by a smaller number of pixels can be secured, and a chip area can be reduced.

Furthermore, according to the present invention, by selecting a clock frequency of a scanning circuit for scanning an OB pixel region from among any frequencies, the same solid-state image pickup apparatus can be loaded in a plurality of systems having different operation frequencies and different required OB pixel output time periods.

Further features of the present invention will become apparent from the following description of exemplary embodiments with reference to the attached drawings.

DESCRIPTION OF THE EMBODIMENTS

Solid-state image pickup apparatuses according to embodiments of the present invention are described below by referring to the attached drawings.

First Embodiment

Figure 1:
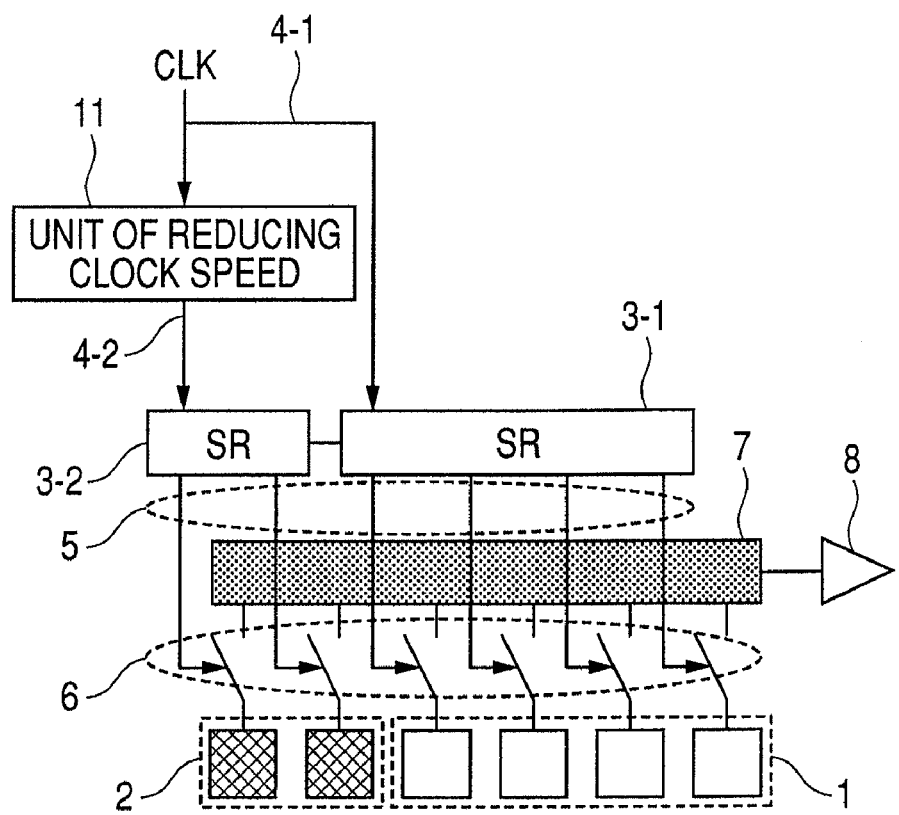
FIG. 1 illustrates a schematic block diagram illustrating the entire configuration of a solid-state image pickup apparatus according to a first embodiment of the present invention.
Figure 8:
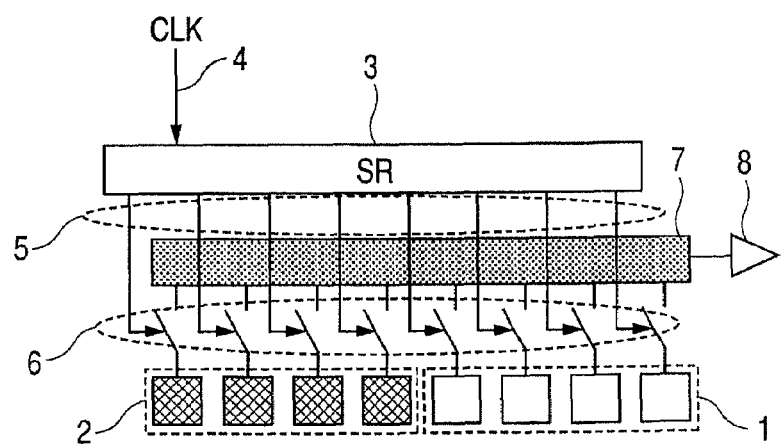
FIG. 8 illustrates a schematic block diagram illustrating the entire configuration of a solid-state image pickup apparatus according to a conventional technology.
Figure 9:
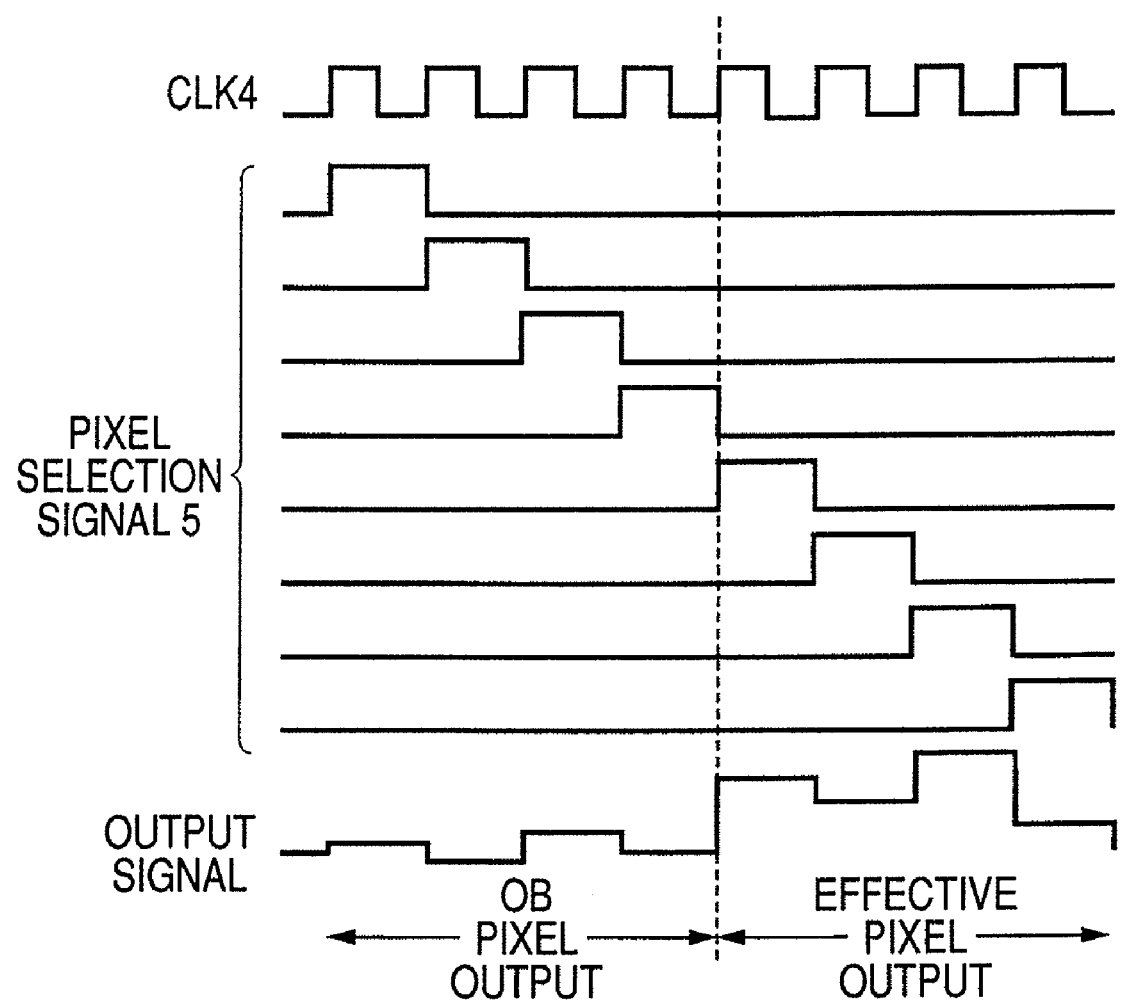
FIG. 9 is a timing chart for describing the operation according to the conventional technology.

FIG. 1 shows an example of the configuration of a solid-state image pickup apparatus according to a first embodiment of the present invention. The common configuration as shown in FIG. 8 is assigned the same reference numerals and the description is simplified or omitted here.

The solid-state image pickup apparatus according to the present embodiment shown in FIG. 1 includes: an effective pixel region 1, an OB pixel region 2, and a pixel selection signal 5 output from first and second scanning circuits in synchronization with first and second clock signals. A pixel selection circuit 6 connects each pixel in the effective pixel region 1 or the OB pixel region 2 to a transfer unit according to the pixel selection signal 5. The apparatus also includes a transfer unit 7, and an output circuit 8. These components are the same as those shown in FIG. 8. In the example shown in FIG. 1, a line sensor includes two OB pixels and four effective pixels.

In FIG. 1, a clock speed reducing unit 11 (configuring a clock input unit according to the present invention). A first scanning circuit 3-1 and a second scanning circuit 3-2 have the same configurations as the scanning circuit shown in FIG. 8. The first scanning circuit 3-1 (configuring the first scanning unit according to the present invention) scans the effective pixel region 1. The second scanning circuit 3-2 (configuring the second scanning unit according to the present invention) scans the OB pixel region 2. The first scanning circuit 3-1 and the second scanning circuit 3-2 are divided depending on the pixel regions. A first clock signal 4-1 drives the first scanning circuit 3-1, and a second clock signal 4-2 drives the second scanning circuit 3-2 after the clock speed reducing unit 11 reduces the speed of a frequency of the first clock signal 4-1. The clock speed reducing unit 11, the first scanning circuit 3-1, and the second scanning circuit 3-2 configure the scanning unit of the present invention.

Figure 2:
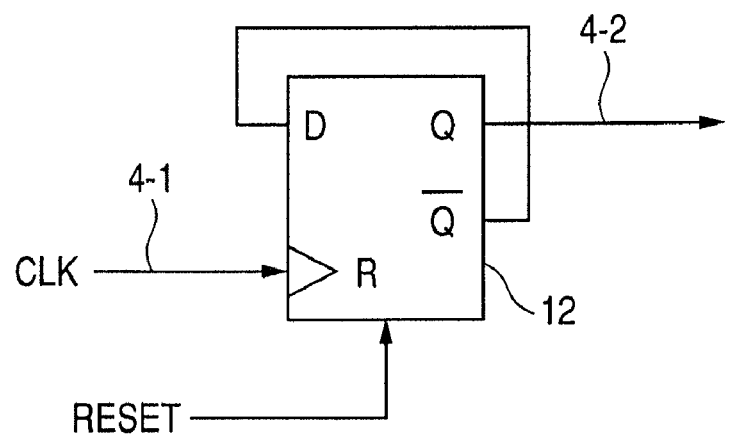
FIG. 2 illustrates a circuit diagram illustrating the internal configuration of the clock speed reducing unit illustrated in FIG. 1.

An example of the clock speed reducing unit 11 can be a frequency divider shown in FIG. 2. As shown in FIG. 2, the frequency divider has a normal input terminal (D), a clock terminal (CLK), an output terminal (Q), an inverse output terminal (Q bar), and a reset terminal (R), and also includes a toggle flip-flop circuit (hereinafter referred to as an R-TFF) 12 with the inverse output terminal and the normal input terminal being shorted. When the first clock signal 4-1 is input to the clock terminal using the R-TFF 12, the second clock signal 4-2 having the ½ frequency of the first clock signal 4-1 can be obtained from the output terminal. The reset terminal is required to keep the constant phase relationship between the first clock signal 4-1 and the second clock signal 4-2.

Next, the operation of the present embodiment is described below by referring to a timing chart shown in FIG. 3.

First, when the first clock signal (CLK) 4-1 is input, the R-TFF 12 configuring the clock speed reducing unit 11 outputs the second clock signal (CLK) 4-2 obtained by ½ reducing the speed of the frequency of the CLK 4-1. The CLK 4-1 and the CLK 4-2 are respectively input to the first scanning circuit 3-1 and the second scanning circuit 3-2.

When the CLK 4-2 is input, the second scanning circuit 3-2 outputs the pixel selection signal 5 synchronous to the CLK 4-2 to the pixel selection circuit 6 connected between each pixel (OB pixel) in the OB pixel region 2 and the transfer unit 7. On the other hand, when the CLK 4-1 is input, the first scanning circuit 3-1 outputs the pixel selection signal 5 synchronous to the CLK 4-1 to the pixel selection circuit 6 connected between each pixel (effective pixel) in the effective pixel region 1 and the transfer unit 7.

Figure 3:
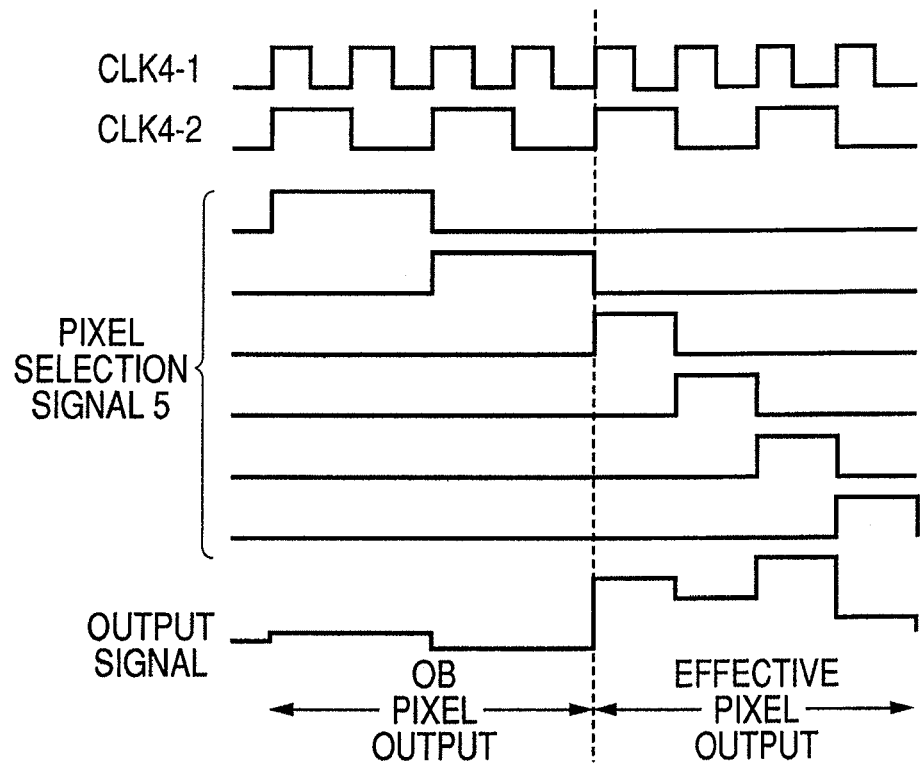
FIG. 3 is a timing chart for describing the operation according to the first embodiment of the present invention.

Thus, the pixel selection signals 5 synchronous to the CLK 4-1 and the CLK 4-2 are sequentially output from the first scanning circuit 3-1 and the second scanning circuit 3-2, and sequentially selected pixel by pixel in a time series as shown in FIG. 3. Thus, the selected pixel is connected to the transfer unit 7 through the pixel selection circuit 6, and an electric signal stored in the pixel is transferred and output to the output circuit 8. The electric signal output from each pixel of the OB pixel region 2 is fetched by a clamping unit and an averaging unit in a signal processing unit (not shown in the attached drawings) at the subsequent stage, and is used at a black reference level. The electric signal from each pixel in the effective pixel region 1 is input to the signal processing unit (not shown in the attached drawings) and processed as image information.

Therefore, according to the present embodiment, each pixel in the OB pixel region 2 can be scanned at the ½ frequency of the scanning frequency of each pixel in the effective pixel region 1 as shown in FIG. 3. Therefore, the same OB pixel output time period as in the conventional technology can be realized by using the half number of OB pixels.

As described above, according to the present embodiment, the clock speed reducing unit reduces the scanning frequency of the OB pixel region to a level lower than the scanning frequency in the effective pixel region. Thus, the same OB pixel output time period can be secured using a smaller number of OB pixels than in the conventional technology, thereby realizing a smaller chip area.

In the present embodiment, the frequency divider is configured using the R-TFF as the clock speed reducing unit to half reduce the frequency. However, the present invention is not limited to this configuration or the frequency division ratio.

Second Embodiment

Figure 4:
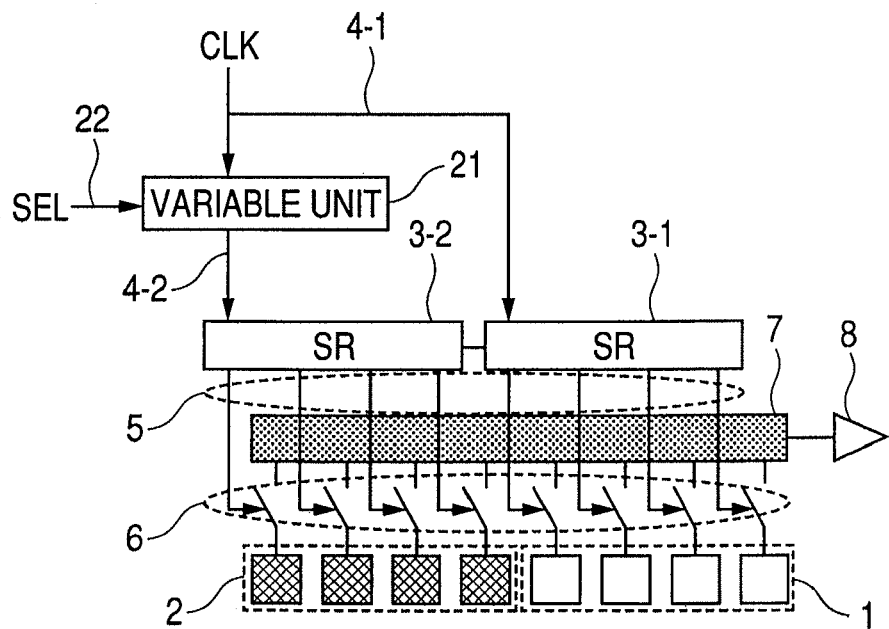
FIG. 4 illustrates a schematic block diagram illustrating the entire configuration of a solid-state image pickup apparatus according to a second embodiment of the present invention.

FIG. 4 shows an example of the configuration of a solid-state image pickup apparatus according to a second embodiment of the present invention. The present embodiment is realized by changing the clock input unit from the clock speed reducing unit in the first embodiment to a variable unit for clock frequency. The common configuration described above by referring to FIG. 1 is assigned the same reference numerals and the description is omitted here.

In the solid-state image pickup apparatus according to the present embodiment shown in FIG. 4, a first variable unit for clock frequency 21 changes a frequency of a first clock signal 4-1 and outputs it as a second clock signal 4-2. A clock frequency control signal (SEL) 22 is connected to the variable unit for clock frequency and controls a frequency of the second clock signal 4-2. The example shown in FIG. 1 shows a line sensor configured by four OB pixels and four effective pixels. The other configuration is the same as in the first embodiment.

Figure 5:
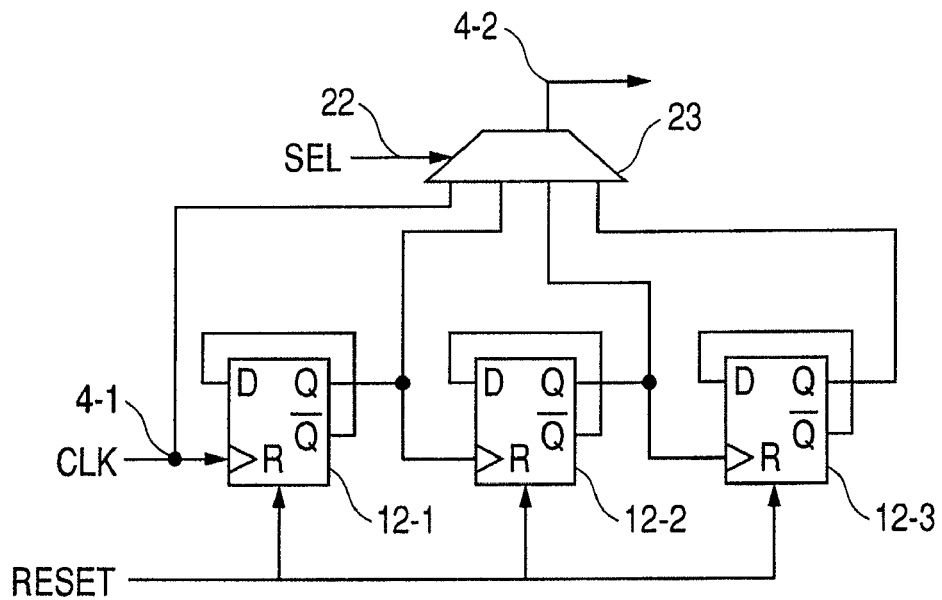
FIG. 5 illustrates a circuit diagram illustrating the internal configuration of the first variable unit for clock frequency illustrated in FIG. 4.

An example of the first variable unit for clock frequency 21 can be the configuration using a plurality of R-TFFs shown in FIG. 5, in this example, a first R-TFF 12-1 to a third R-TFF 12-3. A first clock selection unit 23 receives the first clock signal 4-1 and output clock signals from the first to the third R-TFFs and selects a clock signal output as the second clock signal 4-2 using the clock frequency control signal 22.

When the first clock signal 4-1 is input to a clock terminal, the first R-TFF 12-1 divides the frequency to ½ frequencies, and outputs frequency-divided clock signals to the first clock selection unit 23 and the second R-TFF 12-2. The frequency of each output clock signal is ½ of the frequency of the first clock signal 4-1.

When the second R-TFF 12-2 inputs the output clock signal of the first R-TFF 12-1 to the clock terminal, it divides the frequency into ½ frequencies, and outputs frequency-divided clock signals to the first clock selection unit 23 and the third R-TFF 12-3. The frequency of each output clock signal is ¼ of the frequency of the first clock signal 4-1.

When the third R-TFF 12-3 inputs the output clock signal of the second R-TFF 12-2 to the clock terminal, it divides the frequency into ½ frequencies, and output frequency-divided clock signals to the first clock selection unit 23. The frequency of each output clock signal is 1/16 of the frequency of the first clock signal 4-1.

As a result, the first clock selection unit 23 receives the clock signals of four frequencies of 1, ½, ¼, and 1/16 times the frequency of the first clock signal 4-1. Thus, in the solid-state image pickup apparatus according to the present embodiment, the clock frequency control signal 22 selects a scanning frequency of the OB pixel from the four frequencies, and drives the second scanning circuit 3-2 from the second clock signal 4-2 of the selected frequency.

The operation of the present embodiment is described below. When the first variable unit for clock frequency 21 inputs the CLK 4-1, it selects any frequency of the frequencies of 1, ½, ¼, and 1/16 times the frequency of the CLK 4-1 according to the SEL 22, and outputs the CLK 4-2 of the selected frequency. In this case, the frequency of the CLK 4-2 is selected from among the four frequencies such that it can be lower than the frequency of the CLK 4-1. The CLK 4-1 and the CLK 4-2 are respectively input to the first scanning circuit 3-1 and the second scanning circuit 3-2.

When the second scanning circuit 3-2 receives the CLK 4-2, it outputs the pixel selection signal 5 synchronous to the CLK 4-2 to a pixel selection circuit 6 connected between each pixel of the OB pixel region 2 and a transfer unit 7. On the other hand, when the first scanning circuit 3-1 receives the CLK 4-1, it outputs the pixel selection signal 5 synchronous to the CLK 4-1 to the pixel selection circuit 6 connected between each pixel in the effective pixel region 1 and the transfer unit 7.

Thus, the pixel selection signals 5 synchronous to the CLK 4-1 and the CLK 4-2 are sequentially output from the first scanning circuit 3-1 and the second scanning circuit 3-2, and sequentially selected pixel by pixel in a time series as described above. Thus, the selected pixels and the transfer unit 7 are connected through the pixel selection circuit 6, and an electric signal stored in the pixel is transferred to an output circuit 8 and output.

As described above, according to the present embodiment, by using the variable unit for clock frequency, the clock frequency of the scanning circuit for scanning the OB pixel region is set at a lower speed than the clock frequency of the scanning circuit for scanning the effective pixel region. Thus, the same OB pixel output time period can be secured using a smaller number of OB pixels than in the conventional technology, thereby realizing a smaller chip area. Furthermore, according to the present embodiment, the clock frequency of the scanning circuit for scanning the OB pixel region can be selected from among any frequencies, thereby enabling the same solid-state image pickup apparatus loaded in systems having different operation frequencies and different required OB pixel output time periods.

In the present embodiment, the configuration using the plurality of R-TFFs as the variable unit for clock frequency is described, but the present invention is not limited to this configuration and the frequency division ratio.

Third Embodiment

Figure 6:
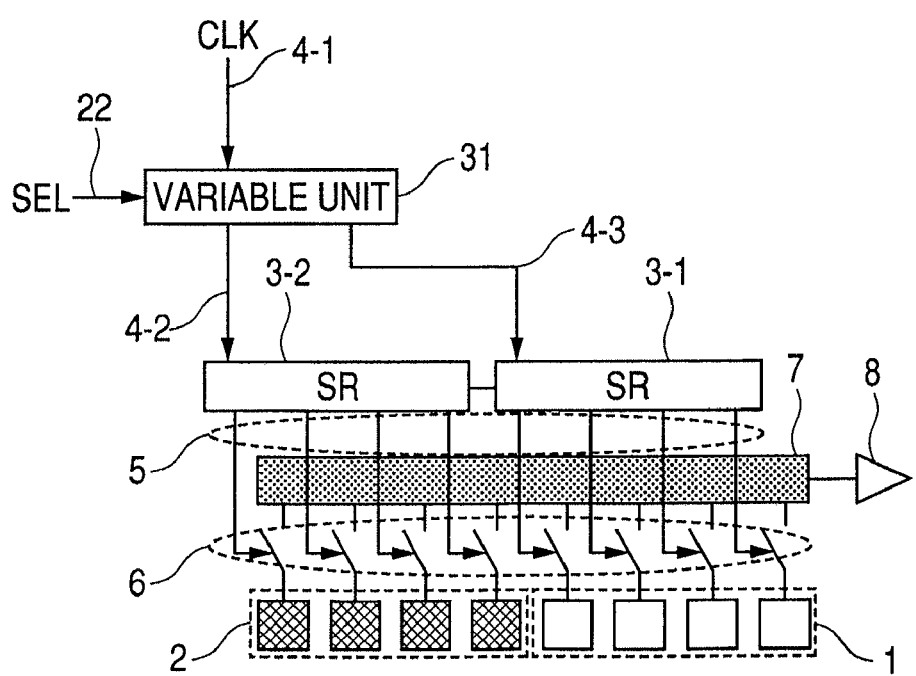
FIG. 6 illustrates a schematic block diagram illustrating the entire configuration of a solid-state image pickup apparatus according to a third embodiment of the present invention.

FIG. 6 shows an example of the configuration of a solid-state image pickup apparatus according to a third embodiment of the present invention. The present embodiment is realized by changing the variable unit for clock frequency in the configuration according to the second embodiment. The common configuration described above by referring to FIG. 4 is assigned the same reference numerals and the description is omitted here.

In the solid-state image pickup apparatus according to the present embodiment shown in FIG. 6, a second variable unit for clock frequency 31 changes a frequency of a first clock signal 4-1 and outputs it as a second clock signal 4-2 and a third clock signal 4-3. The third clock signal 4-3 is output from the second variable unit for clock frequency 31, and drives a first scanning circuit 3-1. The example shown in FIG. 6 shows a line sensor configured by four OB pixels and four effective pixels. The other configuration is the same as in the second embodiment.

Figure 7:
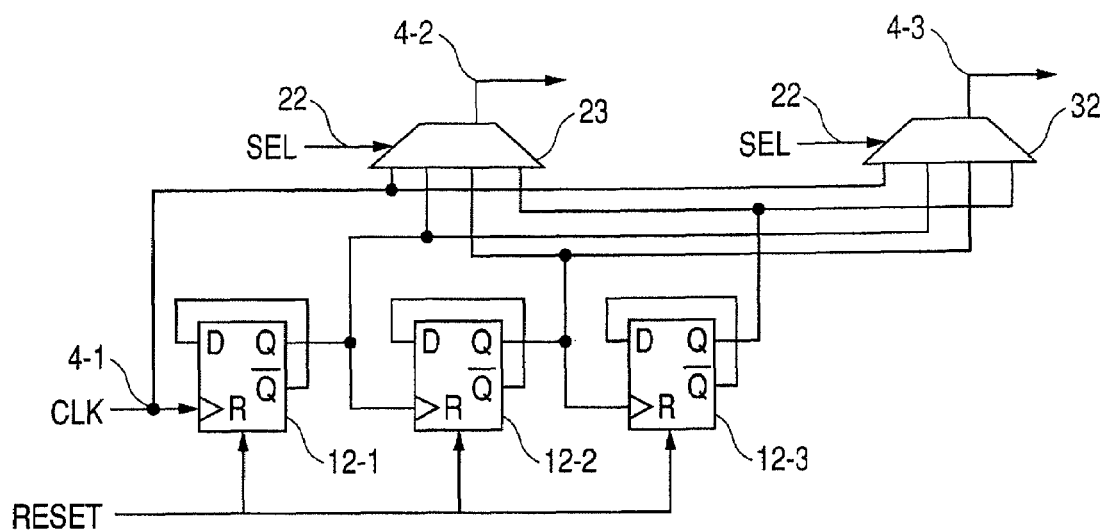
FIG. 7 illustrates a circuit diagram illustrating the internal configuration of the second variable unit for clock frequency illustrated in FIG. 6.

An example of the second variable unit for clock frequency 31 can be the configuration as shown in FIG. 7. The common configuration described above by referring to FIG. 5 is assigned the same reference numerals and the description is omitted here.

In FIG. 5, a first clock selection unit 23 receives the CLK 4-1 and output clock signals from first to third R-TFFs 12-1 to 12-3 and selects a clock signal output as the CLK 4-2 using a clock frequency control signal 22. They are the same as those in the second embodiment. A second clock selection unit 32 receives the CLK 4-1 and output clock signals from the first to the third R-TFFs 12-1 to 12-3, and selects a clock signal output as the CLK 4-3 by the clock frequency control signal 22. The SEL 22 input to the first clock selection unit 23 configures the first clock frequency control signal according to the present invention, and the SEL 22 input to the second clock selection unit 32 configures the second clock frequency control signal according to the present invention.

In the configuration according to the second embodiment, the frequency of the CLK 4-2 is optionally selected from the four frequencies of the CLK 4-1 and the output clock signals from the first to third R-TFF 12-1 to 12-3. On the other hand, in the case of the configuration according to the present embodiment, the frequency of the CLK 4-3 can be optionally selected from the four frequencies of the CLK 4-1 and the output clock signals from the first R-TFF 12-1 to the third R-TFF 12-3.

The operation of the present embodiment is described below. When the variable unit for clock frequency 31 inputs the CLK 4-1, it selects any frequency of the frequencies of 1, ½, ¼, and ¹⁄₁₆ times the frequency of the CLK 4-1 according to the SEL 22, and outputs the CLK 4-2 and the CLK 4-3 of the selected frequencies. In this case, the frequency of the CLK 4-2 is selected from among the four frequencies such that it can be lower than the frequency of the CLK 4-3. For example, when the frequency of the CLK 4-3 is the same as the frequency of the CLK 4-1, the frequency of the CLK 4-2 is selected from the three frequencies of the ½, ¼, and ¹⁄₁₆ times the frequency of the CLK 4-1. When the frequency of the CLK 4-3 is ½ times the frequency of the CLK 4-1, the frequency of the CLK 4-2 is selected from the two frequencies of the ¼ times the CLK 4-1 and the ¹⁄₁₆ times the frequency of the CLK 4-1. The CLK 4-2 and the CLK 4-3 are respectively input to the second scanning circuit 3-2 and the first scanning circuit 3-1.

When the second scanning circuit 3-2 receives the CLK 4-2, it outputs the pixel selection signal 5 synchronous to the CLK 4-2 to a pixel selection circuit 6 connected between each pixel (OB pixel) of the OB pixel region 2 and a transfer unit 7. On the other hand, when the first scanning circuit 3-1 receives the CLK 4-3, it outputs the pixel selection signal 5 synchronous to the CLK 4-3 to the pixel selection circuit 6 connected between each pixel (effective pixel) in the effective pixel region 1 and the transfer unit 7.

Thus, the pixel selection signals 5 synchronous to the CLK 4-2 and the CLK 4-3 are sequentially output from the first scanning circuit 3-1 and the second scanning circuit 3-2, and sequentially selected pixel by pixel in a time series as described above. Thus, the selected pixels and the transfer unit 7 are connected through the pixel selection circuit 6, and an electric signal stored in the pixel is transferred to an output circuit 8 and output.

As described above, according to the present embodiment, by using the variable unit for clock frequency, the clock frequency of the scanning circuit for scanning the OB pixel region is set at a lower speed than the clock frequency of the scanning circuit for scanning the effective pixel region. Thus, the same OB pixel output time period can be secured using a smaller number of OB pixels than in the conventional technology, thereby realizing a smaller chip area. Furthermore, according to the present embodiment, the same solid-state image pickup apparatus can be loaded in systems having different operation frequencies and different required OB pixel output time periods.

In the present embodiment, the configuration using the plurality of R-TFFs as the variable unit is described for clock frequency, but the present invention is not limited to this configuration and the frequency division ratio.

The embodiments of the present invention have been described above, and the aspects of exemplary embodiments of the present invention are listed below.

[Aspect 1] A solid-state image pickup apparatus including: a transfer unit for transferring an electric signal from an unshielded first pixel region and a shielded second pixel region into which a plurality of pixels for conversion from an optical signal to an electric signal by an photoelectric conversion unit are divided; an output circuit for outputting the electric signal transferred from the transfer unit; a first scanning circuit for sequentially and selectively scanning the plurality of pixels in the first region in a time series; a second scanning circuit for sequentially and selectively scanning the plurality of pixels in the second region in a time series; a plurality of pixel selection signals output from the first and second scanning circuits to select each of the plurality of pixels, and a plurality of pixel selection circuits for connecting each of the plurality of pixels to the transfer unit according to the pixel selection signals, and characterized in that a clock speed reducing unit for reducing the speed of a frequency of a first clock signal and outputting a second clock signal is provided, the first clock signal is connected to the first scanning circuit, and the second clock signal is connected to the second scanning circuit.

[Aspect 2] The solid-state image pickup apparatus according to aspect 1, characterized in that the clock speed reducing unit is a frequency divider for dividing the frequency of the first clock.

[Aspect 3] A solid-state image pickup apparatus including: a transfer unit for transferring an electric signal from an unshielded first pixel region and a shielded second pixel region into which a plurality of pixels for conversion from an optical signal to an electric signal by an photoelectric conversion unit are divided; an output circuit for outputting the electric signal transferred from the transfer unit; a first scanning circuit for sequentially and selectively scanning the plurality of pixels in the first region in a time series; a second scanning circuit for sequentially and selectively scanning the plurality of pixels in the second region in a time series; a plurality of pixel selection signals output from the first and second scanning circuits to select each of the plurality of pixels, and a plurality of pixel selection circuits for connecting each of the plurality of pixels to the transfer unit according to the pixel selection signals, and characterized in that a first variable unit for clock frequency for changing a frequency of a first clock signal and outputting a second clock signal is provided, the first clock signal is connected to the first scanning circuit, and the second clock signal is connected to the second scanning circuit.

[Aspect 4] The solid-state image pickup apparatus according to aspect 1, characterized in that the first variable unit for clock frequency includes: a frequency divider for dividing the frequency of the first clock signal and outputting a plurality of clock signals of different frequencies; and a first clock selection unit for selectively output any of the plurality of clock signals output by the frequency divider as the second clock signal.

[Aspect 5] A solid-state image pickup apparatus including: a transfer unit for transferring an electric signal from an unshielded first pixel region and a shielded second pixel region into which a plurality of pixels for conversion from an optical signal to an electric signal by an photoelectric conversion unit are divided; an output circuit for outputting the electric signal transferred from the transfer unit; a first scanning circuit for sequentially and selectively scanning the plurality of pixels in the first region in a time series; a second scanning circuit for sequentially and selectively scanning the plurality of pixels in the second region in a time series; a plurality of pixel selection signals output from the first and second scanning circuits to select each of the plurality of pixels, and a plurality of pixel selection circuits for connecting each of the plurality of pixels to the transfer unit according to the pixel selection signals, and characterized in that a variable unit for clock frequency for changing a frequency of a first clock signal and outputting second and third clock signals is provided, the third clock signal is connected to the first scanning circuit, and the second clock signal is connected to the second scanning circuit.

[Aspect 6] The solid-state image pickup apparatus according to aspect 5, characterized in that the second variable unit for clock frequency includes: a frequency divider for dividing the frequency of the first clock signal and outputting a plurality of clock signals of different frequencies; a first clock selection unit for selectively outputting any of the plurality of clock signals output by the frequency divider as the second clock signal; and a second clock selection unit for selectively outputting any of the plurality of clock signals output by the frequency divider as the third clock signal.

Each embodiment of the present invention is described in detail above, but the present invention is not limited to each embodiment described as typical examples, and those skilled in the art can vary and modify various aspects within the scope of the gist of the present invention. These variations and modifications also belong to the scope of the right of the present invention.

The present invention can be applied to a use of the solid-state image pickup apparatus for use in an image reading apparatus such as a copying machine, a scanner, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-127551, filed May 1, 2006, which is hereby incorporated by reference herein in its entirety.

What is claimed is:

1. An image pickup apparatus, comprising:
   a plurality of pixels arranged in a first unshielded pixel region and a shielded second pixel region and each including a photoelectric conversion unit for converting an optical signal into an electric signal; and
   a scanning unit for selectively scanning the plurality of pixels according to a pixel selection signal in synchronization with a clock signal, and for transferring and outputting the electric signal scanned from the plurality of pixels,
   wherein the scanning unit includes:
      a first scanning unit for selectively scanning the plurality of pixels arranged in the first pixel region according to the pixel selection signal,
      a second scanning unit for selectively scanning the plurality of pixels arranged in the second pixel region according to the pixel selection signal, and
      a clock input unit capable of independently inputting a clock signal having a different frequency to each of the first and second scanning units,
   wherein the clock signal that is inputted to the second scanning unit is lower in frequency than the clock signal that is inputted to the first scanning unit, and wherein the clock input unit includes a clock speed reducing unit for generating a clock signal obtained by reducing a speed of a frequency of a first clock signal and outputting the generated clock signal as a second clock signal to the second scanning unit.

2. The image pickup apparatus according to claim 1, wherein the clock speed reducing unit is a frequency divider for dividing a frequency of the first clock signal and outputting the frequency-divided clock signal as the second clock signal.

3. The image pickup apparatus according to claim 1, wherein the clock input unit includes:
   a variable unit for clock frequency for generating a clock signal in which a frequency of the first clock signal is changed according to a clock frequency control signal and outputting the generated clock signal as the second clock signal to the second scanning unit, and
   a control input unit for inputting the clock frequency control signal to the variable unit for clock frequency.

4. The image pickup apparatus according to claim 3, wherein the variable unit for clock frequency includes:
   a frequency divider for dividing a frequency of the first clock signal and outputting a plurality of frequency-divided clock signals having different frequencies, and
   a first clock selection unit for selectively outputting any of the plurality of clock signals outputted by the frequency divider as the second clock signal according to the clock frequency control signal.

5. An image pickup apparatus, comprising:
   a plurality of pixels arranged in a first unshielded pixel region and a shielded second pixel region and each having a photoelectric conversion unit for converting an optical signal into an electric signal; and
   a scanning unit for selectively scanning the plurality of pixels according to a pixel selection signal in synchronization with a clock signal, and for transferring and outputting the electric signal scanned from the plurality of pixels,
   wherein the scanning unit includes:
      a first scanning unit for selectively scanning the plurality of pixels arranged in the first pixel region according to the pixel selection signal,
      a second scanning unit for selectively scanning the plurality of pixels arranged in the second pixel region according to the pixel selection signal, and
      a clock input unit capable of independently inputting a clock signal having a different frequency to each of the first and second scanning units,
   wherein the clock signal that is inputted to the second scanning unit is lower in frequency than the clock signal that is inputted to the first scanning unit,
   wherein the clock input unit includes:
      a variable unit for clock frequency for generating a clock signal in which a frequency of a first clock signal is changed according to a first clock frequency control signal and outputting the generated clock signal as a second clock signal to the second scanning unit, and for generating a clock signal in which a frequency of the first clock signal is changed according to a second clock frequency control signal and outputting the generated clock signal as a third clock signal to the first scanning unit, and
      a control input unit for inputting the first and second clock frequency control signals to the variable unit for clock frequency; and
   wherein the first scanning unit selectively scans the plurality of pixels arranged in the first pixel region according to a third pixel selection signal in synchronization with the third clock signal.

6. The image pickup apparatus according to claim 5, wherein the variable unit for clock frequency includes:
   a frequency divider for dividing a frequency of the first clock signal and outputting a plurality of frequency-divided clock signals having different frequencies,
   a first clock selection unit for selectively outputting any of the plurality of clock signals outputted by the frequency divider as the second clock signal according to the first clock frequency control signal, and
   a second clock selection unit for selectively outputting any of the plurality of clock signals outputted by the frequency divider as the third clock signal according to the second clock frequency control signal.

* * * * *